2,928,871
1-TERPENYL-3-ARYLSULFONYLUREAS

John Alfred Aeschlimann, Montclair, and Arthur Stempel, Teaneck, N.J., assignors to Hoffmann-La Roche Inc., Nutley, N.J., a corporation of New Jersey No Drawing. Application October 1, 1957
Serial No. 687,373

6 Claims. (Cl. 260—553)

This invention relates to novel chemical compounds. More particularly, the invention relates to novel chemical compounds having the formula

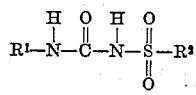

wherein $R^1$ represents the bicyclic $C_{10}H_{17}$ hydrocarbon radical of a bicyclic terpene alcohol $R^1OH$, and $R^2$ represents a monovalent hydrocarbon radical of an aryl hydrocarbon $R^2H$. Illustrative bicyclic terpene alcohols, $R^1OH$, referred to above, include thujyl alcohol, pinocampheol, borneol, isoborneol, fenchyl alcohol, isofenchyl alcohol, and the like. Illustrative aryl hydrocarbons, $R^2H$, referred to above, include benzene, toluene, xylene, mesitylene, naphthalene, and the like. Especially preferred examples of $R^1$ include d-(—)-neobornyl, d-(+)-bornyl and fenchyl. Especially preferred examples of $R^2$ include monocyclic aryl hydrocarbon radicals, particularly phenyl and p-tolyl.

The compounds having the above formula are useful as pharmaceuticals, more particularly as hypoglycemic agents; these compounds are active, notably upon oral ingestion, in reducing the level of glucose in the blood. The compound 1-d-(—)-neobornyl-3-p-tolylsulfonylurea is one especially preferred compound of the invention, because of its long duration of action.

The compounds of the invention can be made by general methods known per se, for example, they can be made by reacting an amine, $R^1NH_2$, with an aryl hydrocarbon sulfonylisocyanate, $R^2SO_2NCO$. An alternative method comprises reacting an amine, $R^1NH_2$, with an aryl hydrocarbon sulfonylurea, $R^2SO_2NHCONH_2$. It will be understood that in this reference to methods of preparation, the symbols $R^1$ and $R^2$ have the same meanings indicated above.

The invention is further disclosed in the following examples, which are illustrative but not limitative thereof. Temperatures are stated in degrees centigrade, uncorrected.

Example 1

4.25 g. of d-(—)-neobornylamine [made by catalytic reduction of d-(—)-camphor oxime in glacial acetic acid using Adams platinum dioxide hydrogenation catalyst, as disclosed by Alder and Stein, Liebigs Annalen 525,221 (1936)] was dissolved in 200 ml. of benzene. 5.5 g. of p-tolylsulfonylisocyanate was added to the solution. The reaction mixture was allowed to stand overnight at room temperature; a crystalline precipitate was observed. An equal volume of n-hexane was added to reduce the solubility of the product in the solvent. The precipitated material was filtered off and recrystallized from aqueous ethanol. There was thus obtained 1-[d-(—)-neobornyl]-3-p-tolylsulfonylurea, M.P. 200–202°, $[\alpha]_D^{25}=-34.2°$ in ethanol.

Example 2

To a solution of 169 g. of d-(—)-neobornylamine, prepared as described in the preceding example, in 4.5 l. of dioxan was added 236 g. of p-tolylsulfonylurea. The resulting suspension was stirred and heated to reflux. Ammonia was evolved and after thirty minutes all of the solid material had dissolved. Refluxing was continued for one hour longer. The reaction mixture was then cooled, and to it 4.5 l. of water was added slowly, while stirring. The resulting precipitate was filtered off and the moist filter cake was recrystallized from acetonitrile. There was thus obtained 1-[d-(—)-neobornyl]-3-p-tolylsulfonylurea, M.P. 200–201.5°, $[\alpha]_D^{24}=-34.0°$ in ethanol.

Example 3

25 g. of d-(—)-camphor oxime was dissolved in 250 ml. of ethanolic ammonia (containing 10% by weight $NH_3$). 10 g. of Raney nickel hydrogenation catalyst was added. This mixture was subjected to catalytic hydrogenation at 60° under a hydrogen pressure of 500 p.s.i. gauge until the theoretical amount of hydrogen was taken up. The reaction mixture was filtered to remove the catalyst and the filtrate was concentrated to dryness in vacuo. There was thus obtained a mixture of levo- and dextrorotatory bornylamines having $[\alpha]_D^{25}=+7.85$ in ethanol.

5 g. of the above mixed bornylamine product was dissolved in 300 ml. of benzene. 6.5 g. of p-tolylsulfonylisocyanate was added. The reaction mixture was allowed to stand for three hours at room temperature and was then extracted five times with 5% aqueous sodium hydroxide solution, 200 ml. of alkali solution being used for each extraction. The combined alkaline extracts were filtered through a filter aid and the clear filtrate was acidified with 12 N aqueous hydrochloric acid solution. The precipitated material was recrystallized from a mixture of ethyl acetate and n-hexane, yielding a mixture of 1-[d-(—)- and 1-[d-(+)-bornyl]-3-p-tolyl-sulfonylurea, M.P. 195–197°, $[\alpha]_D^{25}=-15.0$ in ethyl acetate.

Example 4

3.1 g. of the same mixed (levo- and dextrorotatory)-bornylamine product described in Example 3 above was dissolved in 250 ml. of benzene. 3.6 g. of phenylsulfonylisocyanate was added. The reaction mixture was allowed to stand two days at room temperature and then was concentrated in vacuo. The residue was crystallized from a mixture of ethyl acetate and n-hexane. There was obtained a mixture of 1-[d-(—)- and 1-[d-(+)-bornyl]-3-phenylsulfonylurea, M.P. 199–201.5°. Further recrystallization from the same solvent-pair raised the melting point to 201–203°.

Example 5

A mixture of levo- and dextrorotatory bornylamines, obtained by reduction of 25 g. of d-(—)-camphor oxime in ethanolic ammonia using Raney nickel catalyst as described in Example 3 above, was dissolved in 250 ml. of ethanol, and to the solution was added 15 ml. of 9 N ethanolic HCl. The solution was concentrated to dryness in vacuo. The residue was recrystallized three times with 6 N aqueous hydrochloric acid solution. The d-(+)-bornylamine hydrochloride thus obtained had a rotation $[\alpha]_D^{25}=+26.7$ in ethanol.

10 g. of d-(+)-bornylamine hydrochloride was dissolved in 250 ml. of water. The solution was made alkaline to pH 10 by addition of 10% aqueous NaOH solution. The precipitated solid was extracted with 200 ml. of benzene, and the extract was dried over anhydrous sodium sulfate. The benzene layer was filtered and concentrated to dryness in vacuo, leaving a residue of d-(+)-bornylamine.

2.9 g. of d-(+)-bornylamine was dissolved in 150 ml. of benzene and to the solution was added 3.7 g. of p-tolylsulfonylisocyanate. The reaction mixture was kept at room temperature for two and one-half hours and then was concentrated to dryness in vacuo. The residue was recrystallized twice from a mixture of ethyl acetate and n-hexane, yielding 1-[d-(+)-bornyl]-3-p-tolylsulfonylurea, M.P. 201–202°, $[\alpha]_D^{27}=+1.12°$ in ethyl acetate, $[\alpha]_D^{25}=-3.67$ in ethanol.

*Example 6*

4.25 g. of d-(−)-neobornylamine, obtained as described in Example 1 above, was dissolved in 200 ml. of benzene, and to the solution was added 5.2 g. of phenylsulfonylisocyanate. The reaction mixture was kept at room temperature for 15 hours and then was concentrated to dryness in vacuo. The amorphous residue was crystallized from a mixture of acetonitrile and water, and the product obtained was recrystallized from a mixture of ethyl acetate and n-hexane. There was thus obtained 1-[d-(−)-neobornyl]-3-phenylsulfonylurea, M.P. 190–192°, $[\alpha]_D^{25}=-37.4$ in ethanol.

*Example 7*

25 g. of fenchone oxime having $[\alpha]_D^{25}=+5.5$ in chloroform was dissolved in 250 ml. of ethanolic ammonia containing 10% by weight $NH_3$. To the solution was added 10 g. of Raney nickel hydrogenation catalyst. The reaction mixture was heated to 60° and was hydrogenated under a hydrogen pressure of 500 p.s.i. gauge until the theoretical amount of hydrogen was taken up. The catalyst was filtered off and the filtrate was concentrated to dryness in vacuo, leaving a residue of fenchylamine.

5.5 g. of fenchylamine obtained as described above was dissolved in 300 ml. of benzene, and to the solution was added 6.5 g. of phenylsulfonylisocyanate. The reaction mixture was allowed to stand for 15 hours at room temperature and was then extracted with 400 ml. of 2 N aqueous sodium hydroxide solution. The alkaline extract was filtered through a filter aid and the clear filtrate was acidified with 6 N aqueous hydrochloric acid solution. The precipitate was recrystallized from a mixture of ethyl acetate and n-hexane, yielding 1-fenchyl-3-phenylsulfonylurea, M.P. 173–183°, $[\alpha]_D^{25}=+3.8$ in ethanol. A second recrystallization from ethyl acetate and n-hexane raised the melting point to 178–185°.

We claim:

1. A compound having the formula

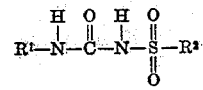

wherein $R^1$ represents the bicyclic $C_{10}H_{17}$ hydrocarbon radical of a bicyclic terpene alcohol and $R^2$ represents a monovalent aryl hydrocarbon radical consisting of hydrogen and carbon.

2. 1-bornyl-3-p-tolylsulfonylurea.
3. 1-[d-(−)-neobornyl]-3-p-tolylsulfonylurea.
4. 1-[d-(+)-bornyl]-3-p-tolylsulfonylurea.
5. 1-[d-(−)-neobornyl]-3-phenylsulfonylurea.
6. 1-fenchyl-3-phenylsulfonylurea.

References Cited in the file of this patent

FOREIGN PATENTS

| | | |
|---|---|---|
| 919,464 | France | Nov. 25, 1946 |
| 1,003,716 | Germany | Mar. 7, 1957 |

OTHER REFERENCES

Germany, F18,659, Dec. 27, 1956.
Germany, F18,339, Dec. 27, 1956.
Karrer: Organic Chemistry, pp. XVI, 588–9; 640–651 (Elsevier, N.Y. 1938).
Whitmore: Organic Chemistry, pp. VII, 567–573, D. Van Nostrand Co., N.Y. (2nd Ed. 1951).